(12) United States Patent
Lin

(10) Patent No.: US 7,411,747 B2
(45) Date of Patent: Aug. 12, 2008

(54) INFRARED LASER LIGHT SOURCE SPREADER

(75) Inventor: Sung-Ken Lin, Taipei County (TW)

(73) Assignee: Camdeor Technology Co., Ltd., Sanchong, Taipei County (TW)

( * ) Notice: Subject to any disclaimer, the term of this patent is extended or adjusted under 35 U.S.C. 154(b) by 0 days.

(21) Appl. No.: 11/609,339

(22) Filed: Dec. 12, 2006

(65) Prior Publication Data

US 2007/0064314 A1    Mar. 22, 2007

(30) Foreign Application Priority Data

Aug. 8, 2006    (TW) ............................... 95128984 A

(51) Int. Cl.
*G02B 9/34* (2006.01)
*G02B 13/14* (2006.01)

(52) U.S. Cl. ....................................... 359/774; 359/356

(58) Field of Classification Search ................. 359/356, 359/774, 775, 772.686–688
See application file for complete search history.

(56) References Cited

U.S. PATENT DOCUMENTS

| 3,011,401 A * | 12/1961 | Sandback .................... 359/774 |
| 3,588,229 A * | 6/1971 | Walker ....................... 359/775 |
| 5,596,455 A | 1/1997 | Eckhardt |
| 6,707,616 B1 * | 3/2004 | Takahashi et al. ........... 359/649 |

FOREIGN PATENT DOCUMENTS

| GB | 1403471 A | 8/1975 |
| RU | 2 111 518 C1 | 5/1998 |

* cited by examiner

*Primary Examiner*—Alicia M Harrington
(74) *Attorney, Agent, or Firm*—Winston Hsu

(57) ABSTRACT

An infrared laser light source spreader has a first biconvex lens, a biconcave lens, a convex-concave lens, and a second biconvex lens. Light from an infrared laser light source is emitted incident to the first biconvex lens, spreads and exits to be incident on the biconcave lens, is further spread and inverted by the biconcave lens, exits to be incident on the convex-concave lens, which collimates the light, and becomes incident on the second biconvex lens, which spreads the light further.

8 Claims, 2 Drawing Sheets

INFRARED LASER LIGHT SOURCE SPREADER

BACKGROUND OF THE INVENTION

1. Field of the Invention

The present invention relates to infrared laser light source spreaders, and more particularly, to an infrared laser light source spreader that uses two biconvex lenses, a convex-concave lens, and a biconcave lens.

2. Description of the Prior Art

With the growth of technology adoption, and particularly the development of improved video display and video recording technologies, video surveillance systems are becoming ever more popular. Many businesses and residences today use video surveillance apparatuses to prevent theft and vandalism, or to aid law enforcement in related investigations/prosecutions. The video surveillance system typically includes a video camera, a video recording apparatus, and a video display.

Normal video cameras traditionally are designed to perform well under daylight conditions. Most acts of theft and vandalism occur at night, as fewer people are outside, and darkness provides a measure of cover from the naked eye. This means that the video camera must also perform well at night. To capture video at night, when visible light is greatly reduced, or in other low-light environments where visible light is unavailable, the video cameras typically employ light emitting diodes (LED) to provide a supplemental light source for the video camera. Because the LED is a scattering light source, a visible range of the video camera is severely limited. The prior art typically provides a visible range of about 50 m, and a longest range provided by the prior art is approximately 150 m. For some applications, this range is insufficient.

SUMMARY OF THE INVENTION

According to the present invention, an infrared laser light source spreader comprises a first biconvex lens, a convex-concave lens, and a biconcave lens disposed between the first biconvex lens and the convex-concave lens, and the second biconvex lens after the convex-concave lens.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
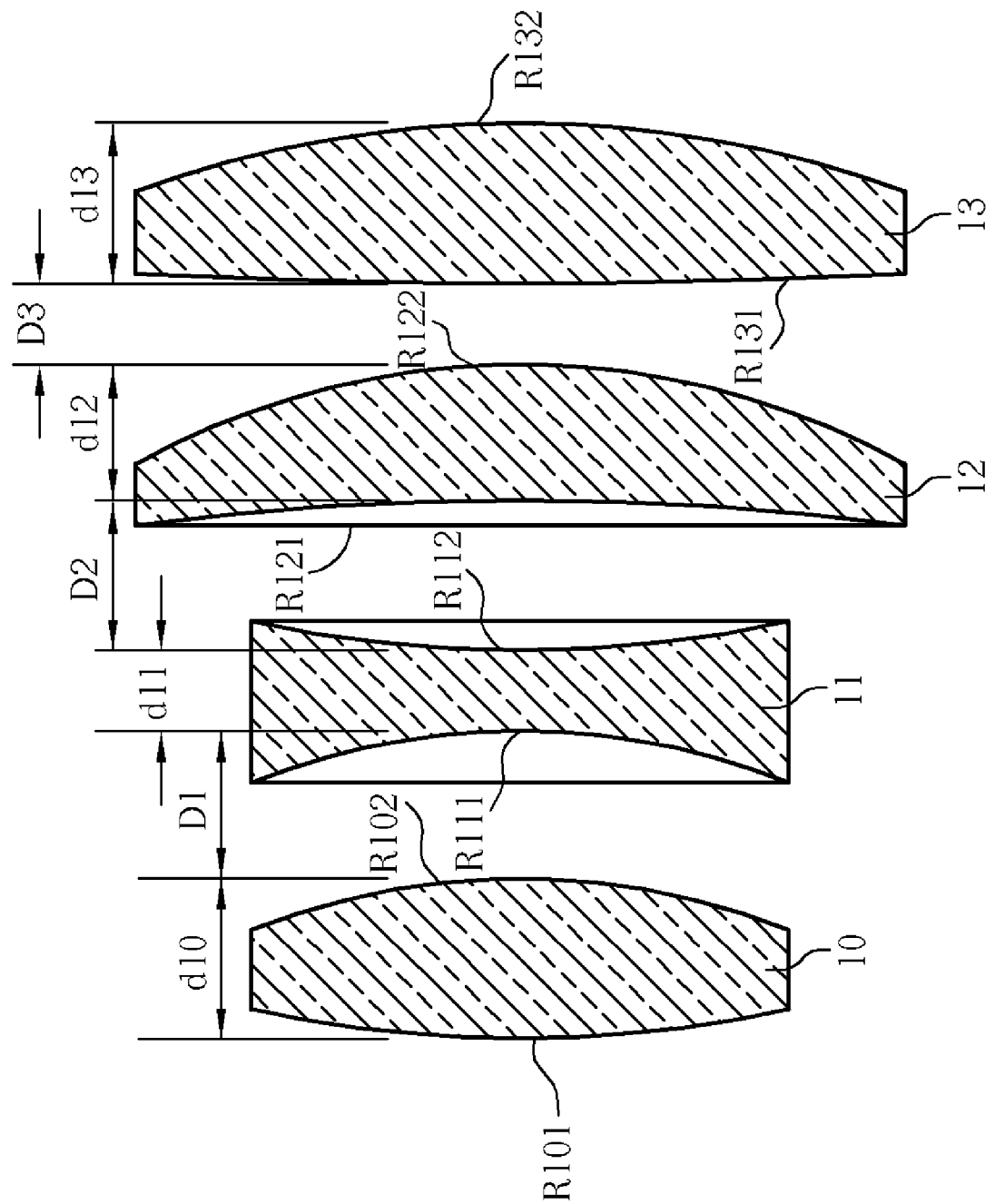
FIG. 1 is a diagram of an infrared laser light source spreader according to the present invention.

Please refer to FIG. 1, which is a diagram of an infrared laser light source spreader according to the present invention. The infrared laser light source spreader comprises a first biconvex lens 10, a biconcave lens 11, a convex-concave lens 12, and a second biconvex lens 13. According to the first embodiment of the present invention, the first biconvex lens 10 has a first radius of curvature R101 in a range from 17.45 mm-21.14 mm, ideally 18.25 mm, a second radius of curvature R102 in a range from 20.49 mm-48.42 mm, ideally 41.90 mm, and a thickness d10 in a range from 3.37 mm-3.95 mm, ideally 3.40 mm. The biconcave lens 11 has a first radius of curvature R111 in a range from 10.10 mm-14.55 mm, ideally 12.59 mm, a second radius of curvature R112 in a range from 19.91 mm-45.54 mm, ideally 39.06 mm, and a thickness d11 in a range from 1.85 mm, ideally 1.85 mm. The first biconvex lens 10 and the biconcave lens 11 are separated by a distance D1 in a range from 3.32 mm-4.20 mm, ideally 3.32 mm. The distance D1 is defined as a distance between a central vertex of a light-exiting face of the first biconvex lens 10 and a central vertex of a light-facing face of the biconcave lens 11. This definition is assumed throughout the rest of the description. The convex-concave lens 12 has a first radius of curvature R121 in a range from 35.22 mm-68.31 mm, ideally 68.31 mm, a second radius of curvature R122 in a range from 14.04 mm-20.42 mm, ideally 16.70 mm, and a thickness d12 in a range from 2.28 mm-3.47 mm, ideally 2.97 mm. The biconcave lens 11 and the convex-concave lens 12 are separated by a distance D2 in a range from 2.99 mm-4.52 mm, ideally 2.99 mm. The second biconvex lens 13 has a first radius of curvature R131 in a range from 47.63 mm-154.85 mm, ideally 154.85 mm, a second radius of curvature R132 in a range from 15.12 mm-22.75 mm, ideally 22.75 mm, and a thickness d13 in a range from 3.50 mm-4.91 mm, ideally 3.50 mm. The convex-concave lens 12 and the second biconvex lens 13 are separated by a distance D3 in a range from 1.77 mm-2.48 mm, ideally 2.48 mm.

The respective radii of curvature, thickness, and separations between lenses can be modified to form a second embodiment of the infrared laser light source spreader according to the present invention. In the second embodiment of the present invention, regarding the first biconvex lens 10, the first radius of curvature 101 ranges from 17.45 mm-21.14 mm, ideally 17.45 mm, the second radius of curvature 102 ranges from 20.49 mm-48.42 mm, ideally 20.49 mm, and the thickness d10 ranges from 3.37 mm-3.95 mm, ideally 3.95 mm. For the biconcave lens 11, the first radius of curvature 111 ranges from 10.10 mm-14.55 mm, ideally 10.10 mm, the second radius of curvature 112 ranges from 19.91 mm-45.54 mm, ideally 19.91 mm, and the thickness d11 ranges from 1.85 mm, ideally 1.85 mm. For the convex-concave lens 12, the first radius of curvature 121 ranges from 35.22 mm-68.31 mm, ideally 35.22 mm, the second radius of curvature 122 ranges from 14.04 mm-20.42 mm, ideally 14.04 mm, and the thickness d12 ranges from 2.28 mm-3.47 mm, ideally 3.47 mm. For the second biconvex lens 13, the first radius of curvature 131 ranges from 47.63 mm-154.85 mm, ideally 47.63 mm, the second radius of curvature 132 ranges from 15.12 mm-22.75 mm, ideally 15.12 mm, and the thickness d13 ranges from 3.50 mm-4.91 mm, ideally 4.91 mm. In the second embodiment, the distance D1 ranges from 3.32 mm to 4.20 mm, the distance D2 ranges from 2.99 mm to 4.52 mm, and the distance D3 ranges from 1.77 mm to 2.99 mm.

The respective radii of curvature, thickness, and separations between lenses can be modified to form a third embodiment of the infrared laser light source spreader according to the present invention. In the third embodiment of the present invention, regarding the first biconvex lens 10, the first radius of curvature 101 ranges from 17.45 mm-21.14 mm, ideally 21.14 mm, the second radius of curvature 102 ranges from 20.49 mm-48.42 mm, ideally 48.42 mm, and the thickness d10 ranges from 3.37 mm-3.95 mm, ideally 3.37 mm. For the biconcave lens 11, the first radius of curvature 111 ranges from 10.10 mm-14.55 mm, ideally 14.55 mm, the second radius of curvature 112 ranges from 19.91 mm-45.54 mm, ideally 45.54 mm, and the thickness d11 ranges from 1.85 mm, ideally 1.85 mm. For the convex-concave lens 12, the first radius of curvature 121 ranges from 35.22 mm-68.31 mm, ideally 40.36 mm, the second radius of curvature 122 ranges from 14.04 mm-20.42 mm, ideally 20.42 mm, and the thickness d12 ranges from 2.28 mm-3.47 mm, ideally 2.28 mm. For the second biconvex lens 13, the first radius of curvature 131 ranges from 47.63 mm-154.85 mm, ideally 53.53 mm, the second radius of curvature 132 ranges from 15.12 mm-22.75 mm, ideally 19.70 mm, and the thickness d13 ranges from 3.50 mm-4.91 mm, ideally 4.50 mm. In the third embodiment, the distance D1 ranges from 3.32 mm to 4.20 mm, the distance D2 ranges from 2.99 mm to 4.52 mm, and the distance D3 ranges from 1.77 mm to 2.48 mm.

Figure 2:
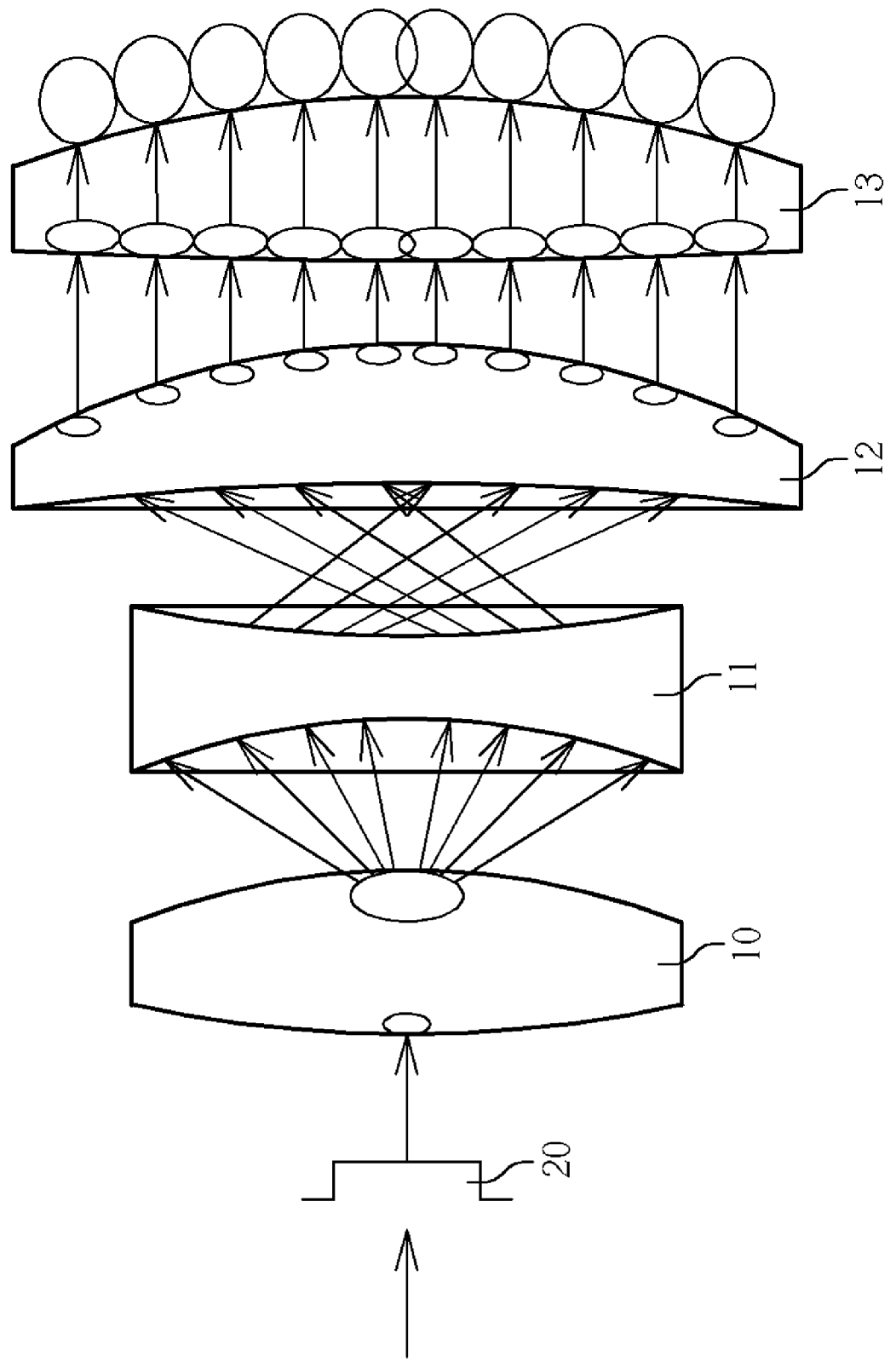
FIG. 2 is a functional diagram of the infrared laser light source spreader according to the present invention.

Please refer to FIG. 2, which is a functional diagram of the infrared laser light source spreader according to the present invention. As can be seen in FIG. 2, light from an infrared laser light source 20 is emitted incident to the first biconvex lens 10, and the light is spread and exits to be incident on the biconcave lens 11. The light is further spread and inverted by the biconcave lens 11, and exits to be incident on the convex-concave lens 12. The convex-concave lens 12 collimates the light, and the light becomes incident on the second biconvex lens 13, which spreads the light further.

It should be noted that the second biconvex lens 13 could be removed from the infrared laser light source spreader described above, and the function of spreading the infrared laser light could still be accomplished. The second biconvex lens 13 helps to spread the light further, but is not necessary to accomplish spreading the light, which is already accomplished in the preceding three lenses.

By using the configuration described above comprising the first biconvex lens, the biconcave lens, the convex-concave lens, and the second biconvex lens, the present invention infrared laser light source spreader can provide a far-reaching, long distance, light source for the video camera. Of course, the infrared laser light source spreader is not limited to use in video surveillance apparatuses, but could also be applied to any system requiring a light source that can reach long distances.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An infrared laser light source spreader comprising:
    a first biconvex lens;
    a convex-concave lens; and
    a biconcave lens disposed between the first biconvex lens and the convex-concave lens;
    wherein the first biconvex lens has a first radius of curvature in a range from 17.45 mm to 21.14 mm, a second radius of curvature in a range from 20.49 mm to 48.42 mm, and a center thickness in a range from 3.37 mm to 3.95 mm; the biconcave lens has a first radius of curvature in a range from 10.10 mm to 14.55 mm, a second radius of curvature in a range from 19.91 mm to 45.54 mm, and a center thickness of 1.85 mm; the convex-concave lens has a first radius of curvature in a range from 35.22 mm to 68.31 mm, a second radius of curvature in a range from 14.04 mm to 20.42 mm, and a center thickness in a range from 2.28 mm to 3.47 mm; and the first biconvex lens and the biconcave lens are separated by a distance in a range from 3.32 mm to 4.20 mm, the biconcave lens and the convex-concave lens are separated by a distance in a range from 2.99 mm to 4.52 mm.

2. The infrared laser light source spreader of claim 1 further comprising a second biconvex lens, the convex-concave disposed between the biconcave lens and the second biconvex lens:
    wherein the second biconvex lens has a first radius of curvature in a range from 47.63 mm to 154.85 mm, a second radius of curvature in a range from 15.12 mm to 22.75 mm, and a center thickness in a range from 3.50 mm to 4.91 mm, and the convex-concave lens and the second biconvex lens are separated by a distance in a range from 1.77 mm to 2.48 mm.

3. The infrared laser light source spreader of claim 2, wherein the first biconvex lens has a first radius of curvature of 18.25 mm, a second radius of curvature of 41.90 mm, and a center thickness of 3.40 mm; the biconcave lens has a first radius of curvature of 12.59 mm, a second radius of curvature of 39.06 mm, and a center thickness of 1.85 mm; the convex-concave lens has a first radius of curvature of 68.31 mm, a second radius of curvature of 16.70 mm, and a center thickness of 2.97 mm; the second biconvex lens has a first radius of curvature of 154.85 mm, a second radius of curvature of 22.75 mm, and a center thickness of 3.50 mm; and the first biconvex lens and the biconcave lens are separated by a distance of 3.32 mm, the biconcave lens and the convex-concave lens are separated by a distance of 2.99 mm, and the convex-concave lens and the second biconvex lens are separated by a distance of 2.48 mm.

4. The infrared laser light source spreader of claim 2, wherein the first biconvex lens has a first radius of curvature of 17.45 mm, a second radius of curvature of 20.49 mm, and a center thickness of 3.95 mm; the biconcave lens has a first radius of curvature of 10.10 mm, a second radius of curvature of 19.91 mm, and a center thickness of 1.85 mm; the convex-concave lens has a first radius of curvature of 35.22 mm, a second radius of curvature of 14.04 mm, and a center thickness of 3.47 mm; the second biconvex lens has a first radius of curvature of 47.63 mm, a second radius of curvature of 15.12 mm, and a center thickness of 4.91 mm; and the first biconvex lens and the biconcave lens are separated by a distance of 3.82 mm, the biconcave lens and the convex-concave lens are separated by a distance of 2.99 mm, and the convex-concave lens and the second biconvex lens are separated by a distance of 2.47 mm.

5. The infrared laser light source spreader of claim 2, wherein the first biconvex lens has a first radius of curvature of 21.14 mm, a second radius of curvature of 48.42 mm, and a center thickness of 3.37 mm; the biconcave lens has a first radius of curvature of 14.55 mm, a second radius of curvature of 45.54 mm, and a center thickness of 1.85 mm; the convex-concave lens has a first radius of curvature of 40.36 mm, a second radius of curvature of 20.42 mm, and a center thickness of 2.28 mm; the second biconvex lens has a first radius of curvature of 53.53mm, a second radius of curvature of 19.70 mm, and a center thickness of 4.50 mm; and the first biconvex lens and the biconcave lens are separated by a distance of 4.20 mm, the biconcave lens and the convex-concave lens are separated by a distance of 4.52 mm, and the convex-concave lens and the second biconvex lens are separated by a distance of 1.77 mm.

6. The infrared laser light source spreader of claim 1, wherein the first biconvex lens has a first radius of curvature of 18.25 mm, a second radius of curvature of 41.90 mm, and a center thickness of 3.40 mm; the biconcave lens has a first radius of curvature of 12.59 mm, a second radius of curvature of 39.06 mm, and a center thickness of 1.85 mm; the convex-concave lens has a first radius of curvature of 68.31 mm, a second radius of curvature of 16.70 mm, and a center thickness of 2.97 mm; and the first biconvex lens and the biconcave lens are separated by a distance of 3.32 mm, and the biconcave lens and the convex-concave lens are separated by a distance of 2.99 mm.

7. The infrared laser light source spreader of claim 1, wherein the first biconvex lens has a first radius of curvature of 17.45 mm, a second radius of curvature of 20.49 mm, and a center thickness of 3.95 mm; the biconcave lens has a first radius of curvature of 10.10 mm, a second radius of curvature of 19.91 mm, and a center thickness of 1.85 mm; the convex-concave lens has a first radius of curvature of 35.22 mm, a second radius of curvature of 14.04 mm, and a center thickness of 3.47 mm; and the first biconvex lens and the biconcave lens are separated by a distance of 3.82 mm, and the biconcave lens and the convex-concave lens are separated by a distance of 2.99 mm.

8. The infrared laser light source spreader of claim 1, wherein the first biconvex lens has a first radius of curvature of 21.14 mm, a second radius of curvature of 48.42 mm, and a center thickness of 3.37 mm; the biconcave lens has a first radius of curvature of 14.55 mm, a second radius of curvature of 45.54 mm, and a center thickness of 1.85 mm; the convex-concave lens has a first radius of curvature of 40.36 mm, a second radius of curvature of 20.42 mm, and a center thickness of 2.28 mm; and the first biconvex lens and the biconcave lens are separated by a distance of 4.20 mm, and the biconcave lens and the convex-concave lens are separated by a distance of 4.52 mm.

* * * * *